United States Patent
Clark et al.

(10) Patent No.: US 7,536,247 B2
(45) Date of Patent: May 19, 2009

(54) METHOD AND APPARATUS FOR RECONSTRUCTING AN ACCIDENT USING SIDE SATELLITE LATERAL ACCELERATION SENSORS

(75) Inventors: Todd Clark, Dearborn, MI (US); Yeruva S. Reddy, Farmington Hills, MI (US)

(73) Assignee: Ford Global Technologies, Dearborn, MI (US)

( * ) Notice: Subject to any disclaimer, the term of this patent is extended or adjusted under 35 U.S.C. 154(b) by 412 days.

(21) Appl. No.: 11/164,627

(22) Filed: Nov. 30, 2005

(65) Prior Publication Data

US 2007/0124048 A1     May 31, 2007

(51) Int. Cl.
G08G 1/16 (2006.01)
B60K 22/00 (2006.01)
(52) U.S. Cl. ............................ 701/45; 701/35; 701/47; 280/735; 340/903
(58) Field of Classification Search ............. 701/45–47, 701/35; 280/735; 702/113; 340/903, 435
See application file for complete search history.

(56) References Cited

U.S. PATENT DOCUMENTS

| | | | |
|---|---|---|---|
| 4,992,943 A | 2/1991 | McCracken | |
| 5,202,831 A * | 4/1993 | Blackburn et al. | 701/46 |
| 5,469,628 A * | 11/1995 | Chartrand | 33/608 |
| 6,005,479 A | 12/1999 | Ide | |
| 6,018,980 A | 2/2000 | Kimura et al. | |
| 6,167,335 A * | 12/2000 | Ide et al. | 701/45 |
| 6,246,933 B1 | 6/2001 | Bague | |
| 6,345,219 B1 | 2/2002 | Klemens | |
| 6,553,295 B1 * | 4/2003 | Bauch et al. | 701/45 |
| 6,615,122 B1 * | 9/2003 | Yamashita | 701/45 |
| 6,917,866 B2 | 7/2005 | Grotendick et al. | |
| 7,197,444 B2 * | 3/2007 | Bomar et al. | 703/8 |
| 2002/0107619 A1 | 8/2002 | Klausner et al. | |
| 2004/0032322 A1 | 2/2004 | Kocher et al. | |
| 2008/0046148 A1 * | 2/2008 | Hayashi et al. | 701/45 |

* cited by examiner

Primary Examiner—Tan Q Nguyen
(74) Attorney, Agent, or Firm—Frank MacKenzie

(57) ABSTRACT

An automotive vehicle (10) includes a restraint control module (12) coupled to a memory (50). During an impact, data from various sensors including lateral acceleration sensors (30,32) are stored in the memory (50). A computing device (56) with a memory (58) is used to download the data from the lateral acceleration sensors (30,32) and various other sensors for reconstruction of an accident. From the lateral acceleration sensors (30), (32), a determination may be made as to the struck or unstruck side of the vehicle. The lateral acceleration from the unstruck side of the vehicle is used in the reconstruction.

20 Claims, 3 Drawing Sheets

Ｕ Ｓ ７，５３６，２４７ Ｂ２

METHOD AND APPARATUS FOR RECONSTRUCTING AN ACCIDENT USING SIDE SATELLITE LATERAL ACCELERATION SENSORS

TECHNICAL FIELD

The present invention relates generally to crash reconstruction, and more particularly, to crash reconstruction using lateral acceleration sensors.

BACKGROUND

The United States Federal Government is considering requiring storing of certain sensor data so that accident reconstruction may be performed. The Government has proposed utilizing the data from a central lateral acceleration sensor for use in reconstruction. Side restraint controls typically use satellite lateral acceleration sensors for use in the deployment of side airbags. However, central lateral acceleration signals do not necessarily exist on each vehicle. In some vehicle, central lateral acceleration signal may be available, but too small for accident reconstruction purposes.

Therefore, it would be desirable to provide a method and apparatus for reliably and inexpensively reconstructing an accident scene.

SUMMARY

The present invention utilizes the side satellite lateral acceleration sensors in the reconstruction of the accident.

In one aspect of the invention, a method of reconstructing an accident comprises determining a longitudinal struck side of the vehicle corresponding to an impact from a plurality of crash sensors and utilizing the lateral acceleration data from the lateral acceleration sensor on the opposite side of the vehicle in the reconstruction.

In a further aspect of the invention, a system for reconstructing an accident comprises a first side satellite acceleration sensor generating a first data set, a second side satellite lateral acceleration sensor generating a second data set, a memory storing the first data set and the second data set, and a computing device downloading the first data set and the second data set and determining a struck side of the vehicle corresponding to an impact from the first side satellite data and the second side satellite data and utilizing the data from the non-struck side in a reconstruction.

One advantage of the invention is that vehicles not equipped with a central lateral acceleration sensor can avoid the expense of having to design a central lateral acceleration sensor therein.

Other advantages and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
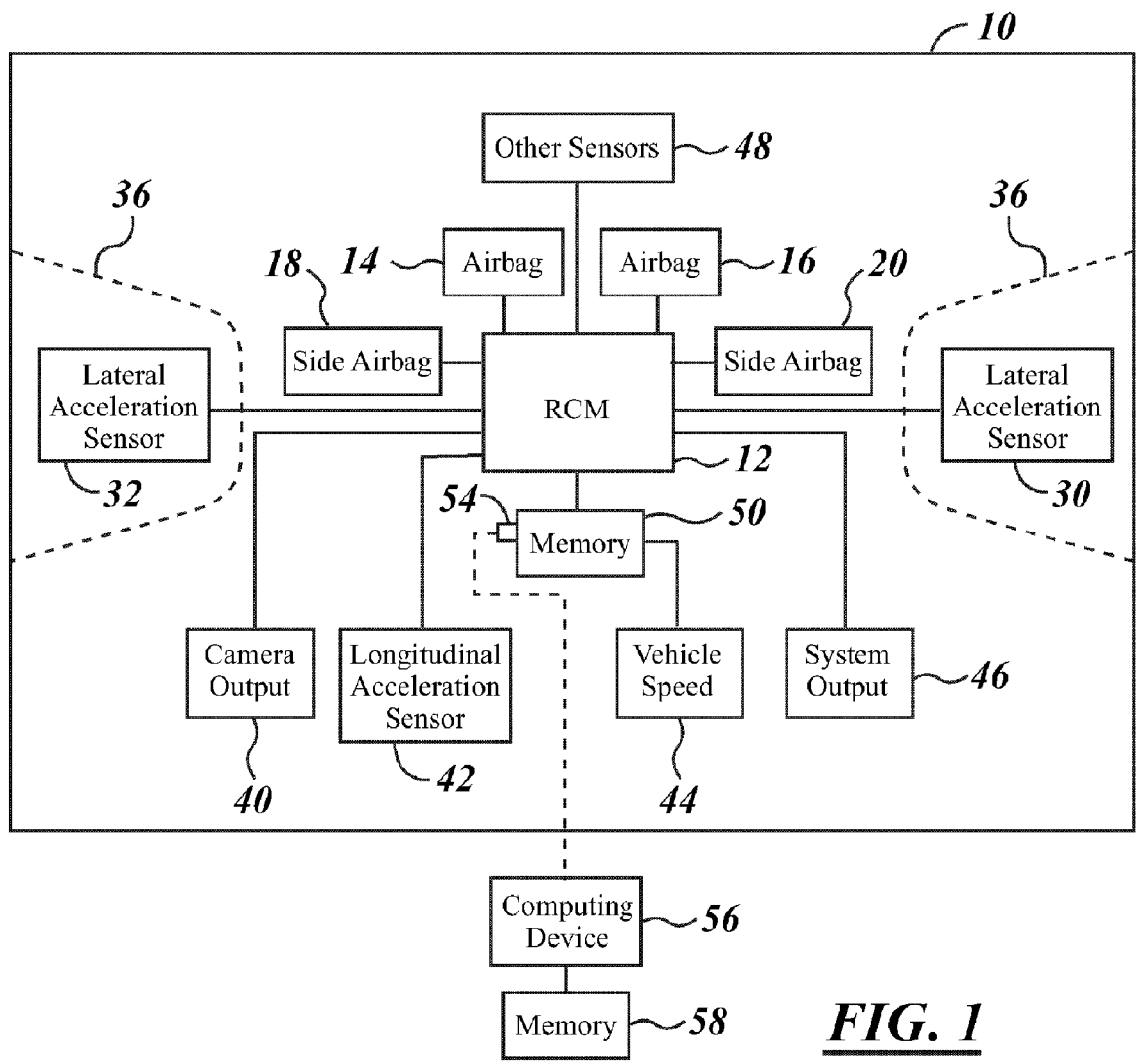
FIG. 1 is a high level block diagrammatic view of a system according to the present invention.

In the following figures the same reference numerals will be used to illustrate the same components. The present invention is set forth with respect to reconstructing an accident using lateral acceleration sensors. Those skilled in the art will recognize that various sensors and combinations of sensors may be used in the reconstruction.

Referring now to FIG. 1, an automotive vehicle 10 includes a restraint control module 12. The restraint control module 12 is used for activating various restraints including a driver front airbag 14, a passenger front airbag 16, a driver side airbag 18, and a passenger side airbag 20. Of course, various types of airbags may be used including multiple stage deployment airbags and side curtain airbags. The restraint control module receives sensor outputs or data from various sensors to determine when to deploy the airbags 14-20. For example, a passenger side lateral acceleration sensor 30 or a driver side lateral acceleration sensor may be used. The lateral acceleration sensors may be located in a body component 36 such as a side door or a B-pillar. Those skilled in the art will recognize the B-pillar is the body structure between the front windshield and the door. The lateral acceleration sensors 30, 32 generate data signals corresponding to the lateral or sideways acceleration of the vehicle. In the figure, the lateral direction is the right to left direction.

The restraint control module 12 may be coupled to various other sensors and systems including a camera output 40. As those skilled in the art will recognize, various cameras are presently on vehicles and proposed to be on vehicles. This information may also help the restraint control module deploy airbags or other restraints. A longitudinal acceleration sensor 42 may also be coupled to the restraint control module 12. A vehicle speed sensor 44 may also be coupled to the restraint control module 12. The vehicle speed sensor 44 may include various types of sensors including four wheel anti-lock brake-type toothed wheel sensors or a transmission sensor. Thus, the vehicle speed sensor 44 does not need to be a separate sensor. Various system outputs 46 may also be coupled to the restraint control module 12. The system output 46 may correspond to various systems in the vehicle including the braking system, roll stability control system, yaw control system, active cruise control system, lane departure system, and the like.

Other sensors 48 that may be discretely added to the vehicle or may be part of other systems may also have outputs coupled to the restraint control module.

The restraint control module 12 is coupled to a memory 50. It should be noted that memory 50 is shown as a discrete memory. However, those skilled in the art will recognize that the restraint control module may include the memory therein. The memory 50 is preferably memory that maintains its contents after power has been removed. EEPROM is one example of a suitable memory. This allows the data from the memory 50 to be removed.

Memory 50 and/or restraint control module 12 may include a connector 54. Connector 54 allows connection of a computing device 56 thereto for downloading the memory 54 into a memory 58. Although the memory 58 is illustrated a separate component, memory 58 may be included within the computing device 56. The computing device 56 may be various types of computing devices including a handheld computer, a laptop computer, or the like. It should be noted that memory 54 may be downloaded directly to memory 58 or may be downloaded using the computing device 56. The computing device 56 may perform various tasks including a determination of the side of the vehicle in which an impact occurred and performing a reconstruction using the data from the memory 54 that has been downloaded into memory 58.

Figure 2:
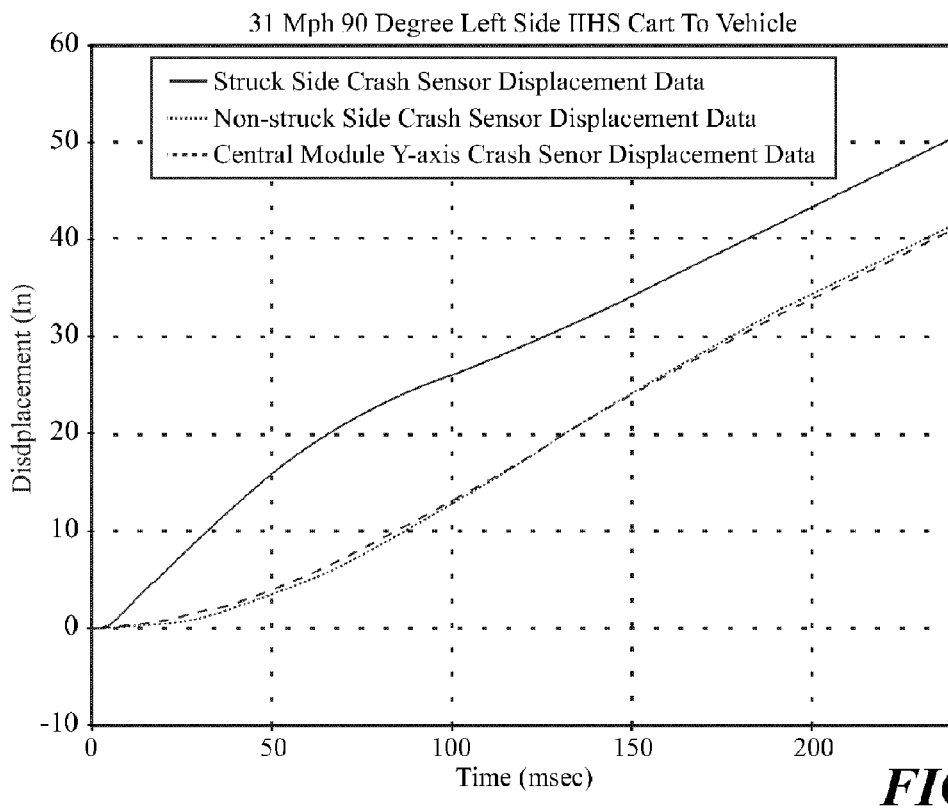
FIG. 2 is a plot of displacement versus time of a 31 mile per hour crash from the left side of the vehicle.
Figure 3:
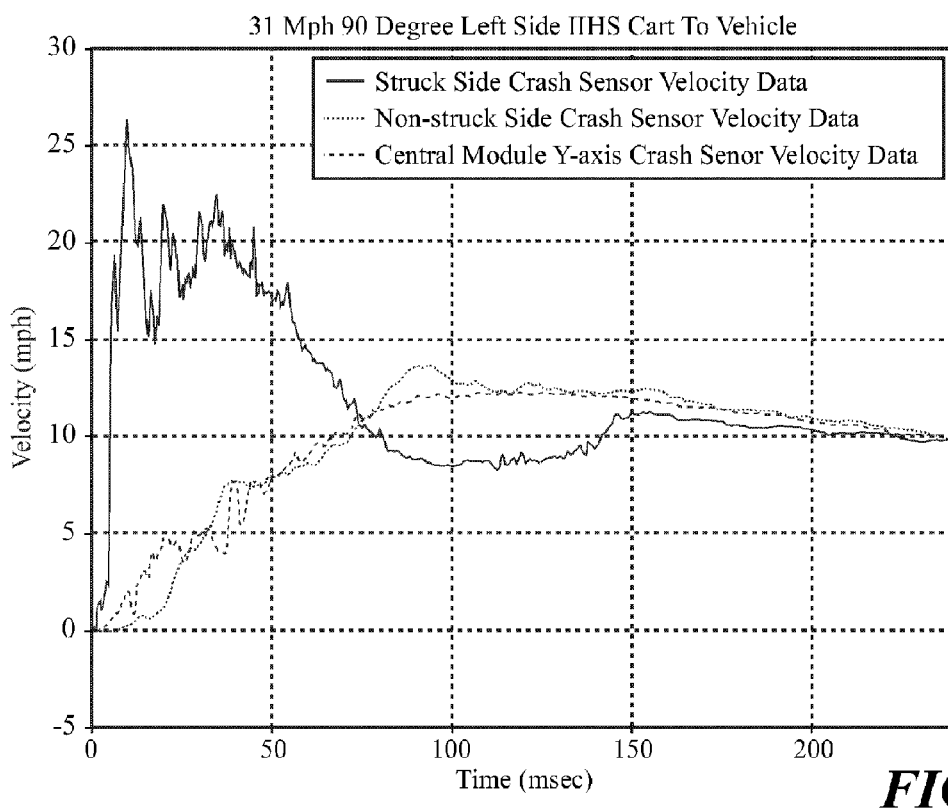
FIG. 3 is a plot of velocity versus time of a 31 mile per hour crash from the left side of the vehicle.
Figure 4:
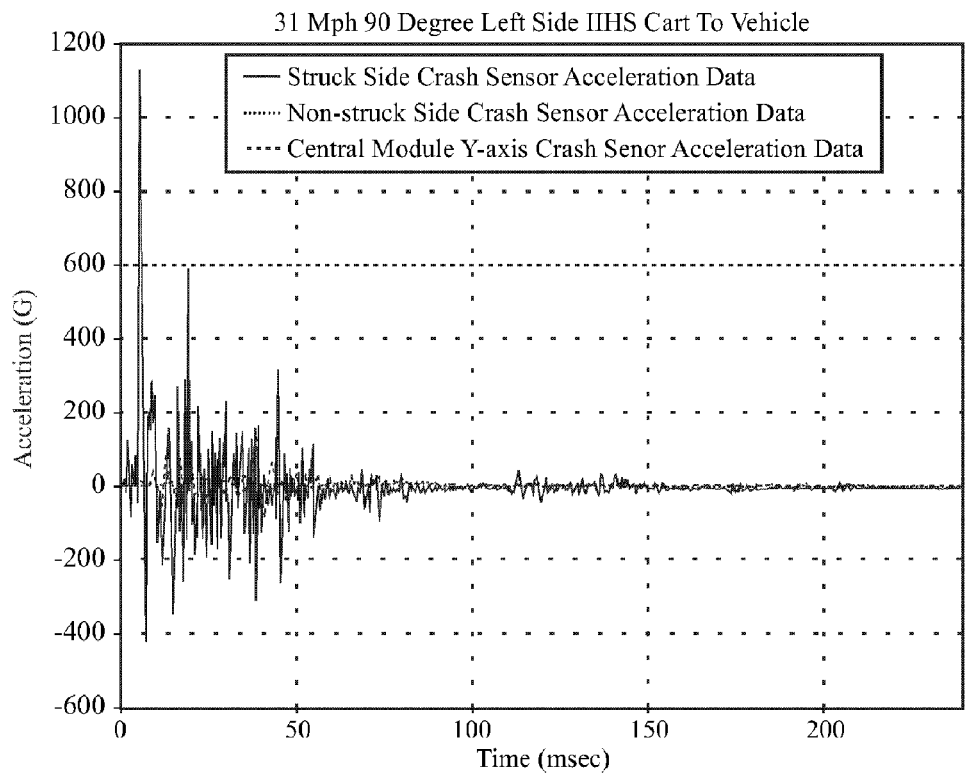
FIG. 4 is a plot of acceleration versus time for a 31 mile per hour left side impact.

Referring now to FIGS. 2, 3 and 4, a plot of displacement, velocity and acceleration are respectively shown versus time for a struck side crash sensor, a non-struck side crash sensor, and a central module y-axis crash sensor. The crash sensors are all lateral or y-axis crash sensors in the plots. As can be seen in each of the plots, the non-struck side and the central module lateral acceleration sensors correlate very precisely. As can be expected, the struck side lateral acceleration displacement and velocity are slightly off from the non-struck side. Therefore, by looking at the output of the lateral acceleration sensors, a determination may be made as to which longitudinal side of the vehicle has been struck. That is, a determination of which lateral side, right or left, of the vehicle may be easily determined looking at the data. Each of the FIGS. 2, 3 and 4 illustrate the struck side, non-struck side and the output of a central module lateral acceleration sensor.

Figure 5:
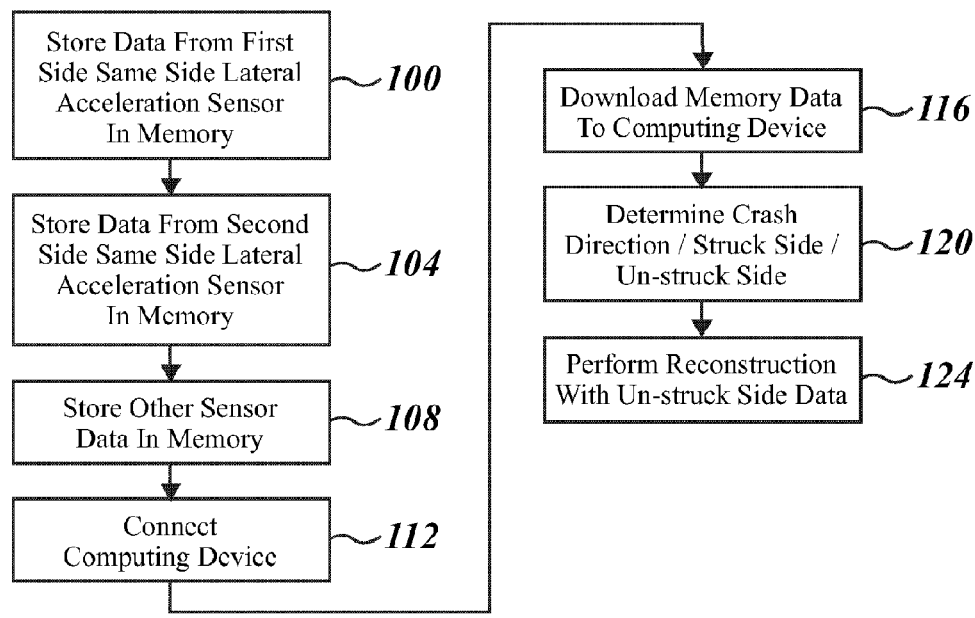
FIG. 5 is a flow chart illustrating a method for operating the present invention.

Referring now to FIG. 5, the process of the present invention begins in step 100. In step 100, the data from the first side satellite lateral acceleration sensor is stored in memory. In step 104, the data from a second side satellite lateral acceleration sensor is stored in memory. In step 108, various other sensor data are stored in the memory. It should be noted that various types of data including vehicle system data, longitudinal acceleration, vehicle speed and the like illustrated in FIG. 1 may be stored in the memory.

After a crash, a computing device is connected to the memory or to the restraint control module for downloading the contents of the memory. In step 116, the memory is downloaded to the computing device or a memory on the computing device. In step 120, the crash direction is determined from the data. As illustrated in FIGS. 2-5, the lateral acceleration sensor data may easily be used to determine which side was the struck side and which side was the unstruck side. The struck side has a large component of lateral acceleration thereon. Once the struck side and unstruck side data is determined, an accident reconstruction is performed in step 124 with the unstruck side data. Preferably, this is performed without the requirement for using a central lateral acceleration sensor. As is illustrated above, the side satellite lateral acceleration sensor from the unstruck side of the vehicle provides adequate indication as to the lateral acceleration of the vehicle. In this manner, without the use of a centralized sensor, the overall cost of performing reconstruction is reduced due to the lack of need to provide the centralized lateral acceleration sensor.

While particular embodiments of the invention have been shown and described, numerous variations and alternate embodiments will occur to those skilled in the art. Accordingly, it is intended that the invention be limited only in terms of the appended claims.

What is claimed is:

1. A method for reconstructing an accident involving a vehicle, said method comprising the steps of:
    interfacing a portable computing device with a data-transfer connector associated with the memory of a control module aboard said vehicle, wherein said memory includes data received from a first sensor located along a first longitudinal side of said vehicle and also data received from a second sensor located along a second longitudinal side of said vehicle;
    downloading said data from said first sensor and also said data from said second sensor onto said portable computing device;
    using said data from said first sensor and also said data from said second sensor to determine whether said first longitudinal side or said second longitudinal side of said vehicle was struck during said accident; and
    using the data from the sensor on the non-struck longitudinal side of said vehicle to reconstruct said accident.

2. A method as set forth in claim 1, wherein said first sensor is a driver-side satellite lateral-acceleration sensor that comprises an accelerometer, and said second sensor is a passenger-side satellite lateral-acceleration sensor that comprises an accelerometer.

3. A method as set forth in claim 1, wherein at least one of the sensors is mounted in a door aboard said vehicle.

4. A method as set forth in claim 1, wherein at least one of the sensors is mounted in a B-pillar aboard said vehicle.

5. A method for reconstructing an accident involving a vehicle, said method comprising the steps of:
    (a) storing data from a driver-side satellite sensor and also data from a passenger-side satellite sensor in a memory aboard said vehicle;
    (b) interfacing a portable computing device with said memory via a data-transfer connector;
    (c) downloading said data from said driver-side satellite sensor and also said data from said passenger-side satellite sensor onto said portable computing device;
    (d) using said data from said driver-side satellite sensor and also said data from said passenger-side satellite sensor to determine whether the driver side or the passenger side of said vehicle was struck during said accident; and
    (e) using the data from the satellite sensor on the non-struck side of said vehicle to reconstruct said accident.

6. A method as set forth in claim 5, wherein said driver-side satellite sensor and said passenger-side satellite sensor each comprise a lateral-acceleration sensor.

7. A method as set forth in claim 6, wherein step (d) is at least partially accomplished by comparing said data from said driver-side satellite sensor with said data from said passenger-side satellite sensor.

8. A method as set forth in claim 5, said method further comprising the step of using downloaded data from other sensors aboard said vehicle to reconstruct said accident.

9. A method as set forth in claim 8, wherein said other sensors include a longitudinal-acceleration sensor.

10. A method as set forth in claim 8, wherein said other sensors include a vehicle speed sensor.

11. A method as set forth in claim 8, wherein said other sensors include a system output.

12. A method as set forth in claim 11, wherein said system output comprises a brake system output.

13. A method as set forth in claim 11, wherein said system output comprises a camera output.

14. A method as set forth in claim 5, wherein said data-transfer connector is a vehicle connector.

15. A method as set forth in claim 5, wherein at least one of the satellite sensors is mounted in a door aboard said vehicle.

16. A method as set forth in claim 5, wherein at least one of the satellite sensors is mounted in a B-pillar aboard said vehicle.

17. A system for reconstructing an accident involving a vehicle, said system comprising:
    a first satellite lateral-acceleration sensor located along the driver side of said vehicle and operable to generate a first data set;

a second satellite lateral-acceleration sensor located along the passenger side of said vehicle and operable to generate a second data set;

a control module with memory located aboard said vehicle, coupled to both said first satellite lateral-acceleration sensor and said second satellite lateral-acceleration sensor, and operable to store said first data set and said second data set;

a data-transfer connector mounted to said control module with memory; and a portable computing device adapted for being connected to said control module with memory via said data-transfer connector;

wherein said portable computing device is operable to (i) download said first data set and said second data set from said control module with memory when connected thereto via said data-transfer connector, (ii) utilize said first data set and said second data set to determine whether said driver side or said passenger side of said vehicle was struck during said accident, and (iii) utilize the data from the non-struck side of said vehicle to reconstruct said accident.

18. A system as set forth in claim 17, said system further comprising a longitudinal-acceleration sensor coupled to said control module with memory.

19. A system as set forth in claim 17, wherein said first satellite lateral-acceleration sensor and said second satellite lateral-acceleration sensor are respectively mounted in a driver-side door and a passenger-side door aboard said vehicle.

20. A system as set forth in claim 17, wherein said first satellite lateral-acceleration sensor and said second satellite lateral-acceleration sensor are respectively mounted in a driver-side B-pillar and a passenger-side B-pillar aboard said vehicle.

* * * * *